United States Patent
Li et al.

(10) Patent No.: US 10,658,702 B2
(45) Date of Patent: May 19, 2020

(54) HIGH-PERFORMANCE THIN-FILM BATTERY WITH AN INTERFACIAL LAYER

(71) Applicant: International Business Machines Corporation, Armonk, NY (US)

(72) Inventors: Ning Li, White Plains, NY (US); Joel P. de Souza, Putnam Valley, NY (US); Yun Seog Lee, Seoul (KR); Devendra K. Sadana, Pleasantville, NY (US)

(73) Assignee: International Business Machines Corporation, Armonk, NY (US)

( * ) Notice: Subject to any disclaimer, the term of this patent is extended or adjusted under 35 U.S.C. 154(b) by 220 days.

(21) Appl. No.: 15/722,743

(22) Filed: Oct. 2, 2017

(65) Prior Publication Data

US 2019/0103636 A1    Apr. 4, 2019

(51) Int. Cl.
| | |
|---|---|
| *H01M 10/0583* | (2010.01) |
| *H01M 10/0525* | (2010.01) |
| *H01M 10/0562* | (2010.01) |
| *H01M 4/04* | (2006.01) |
| *H01M 4/36* | (2006.01) |

(52) U.S. Cl.
CPC ..... *H01M 10/0583* (2013.01); *H01M 4/0426* (2013.01); *H01M 4/366* (2013.01); *H01M 10/0525* (2013.01); *H01M 10/0562* (2013.01); *H01M 2220/30* (2013.01)

(58) Field of Classification Search
CPC .............. H01M 4/0426; H01M 4/366; H01M 10/0525; H01M 10/0562; H01M 10/0583; H01M 2220/20; H01M 2300/0065
See application file for complete search history.

(56) References Cited

U.S. PATENT DOCUMENTS

| | | |
|---|---|---|
| 5,648,187 A | 7/1997 | Skotheim |
| 8,900,743 B2 | 12/2014 | Kim et al. |

(Continued)

FOREIGN PATENT DOCUMENTS

| | | |
|---|---|---|
| CN | 102870256 A | 1/2013 |
| CN | 103165864 A | 6/2013 |

(Continued)

OTHER PUBLICATIONS

International Search Report and Written Opinion dated Jan. 29, 2019, received in a corresponding foreign application.

(Continued)

*Primary Examiner* — Brittany L Raymond
(74) *Attorney, Agent, or Firm* — Scully, Scott, Murphy & Presser, P.C.; JoAnn Kealy Crockatt (57) ABSTRACT

An all solid-state lithium-based thin-film battery is provided. The all solid-state lithium-based thin-film battery includes a battery material stack of, from bottom to top, an anode-side electrode, an anode region, an aluminum oxide interfacial layer, a solid-state electrolyte layer, a cathode layer, and a cathode-side electrode layer. The all solid-state lithium-based thin-film battery stack is formed by first forming the anode-side of the battery stack and thereafter forming the cathode-side. All solid-state lithium-based thin-film batteries including the aluminum oxide interfacial layer located between the anode region and the solid-state electrolyte layer have improved performance, high capacity, and high reliability.

9 Claims, 4 Drawing Sheets

(56) References Cited

U.S. PATENT DOCUMENTS

| | | | |
|---|---|---|---|
| 9,136,569 B2 | 9/2015 | Song et al. | |
| 9,225,046 B2 | 12/2015 | Lee et al. | |
| 9,508,976 B2 | 11/2016 | Herle | |
| 9,666,850 B2 | 5/2017 | Visco et al. | |
| 2004/0048157 A1 | 3/2004 | Neudecker et al. | |
| 2010/0311250 A1 | 12/2010 | Bedell et al. | |
| 2011/0076556 A1* | 3/2011 | Karthikeyan | H01M 4/366 429/188 |
| 2012/0058380 A1 | 3/2012 | Wang et al. | |
| 2013/0149616 A1* | 6/2013 | Lee | H01M 12/06 429/405 |
| 2015/0171431 A1 | 6/2015 | Yamada et al. | |
| 2017/0301955 A1* | 10/2017 | Kwak | H01M 2/0267 |

FOREIGN PATENT DOCUMENTS

| | | |
|---|---|---|
| CN | 203503745 U | 3/2014 |
| CN | 106876707 A | 6/2017 |
| WO | 2011031544 A2 | 3/2011 |
| WO | 2011031544 A3 | 3/2011 |

OTHER PUBLICATIONS

Han, et al., "Negating interfacial impedance in garnet-based solid-state Li metal batteries", Nature Materials, May 2017, pp. 572-579, vol. 16, No. 5.

Kang, et al., "First-Principles Study on the Thermal Stability of LiNiO2 Materials Coated by Amorphous Al2O3 with Atomic Layer Thickness", ACS Applied Materials & Interfaces, Published: May 18, 2015, pp. 11599-11603, vol. 7, No. 21.

Woo, et al., "Nanoscale interface modification of LiCoO2 by Al2O3 atomic layer deposition for solid-state Li batteries", Journal of The Electrochemical Society, Published Jul. 17, 2012, pp. A1120-A1124, vol. 159, No. 7.

Cho, et al., "Enhancement of Electrochemical Properties of Si Alloy Anodes by Ultrathin Al2O3 Atomic Layer Deposition for Li-Ion Batteries", The Electrochemical Society Meeting Abstracts, May 2013, p. 208, No. 4.

* cited by examiner

HIGH-PERFORMANCE THIN-FILM BATTERY WITH AN INTERFACIAL LAYER

BACKGROUND

The present application relates to an all solid-state thin film battery and a method of forming the same. More particularly, the present application relates to all solid-state lithium-based thin-film battery having enhanced performance, and a method of forming such a battery.

In recent years, there has been an increased demand for portable electronic devices such as, for example, computers, mobile phones, tracking systems, scanners, medical devices, smart watches, and fitness devices. One drawback with portable electronic devices is the need to include a power supply within the device itself. Typically, a battery is used as the power supply of such portable electronic devices. Batteries must have sufficient capacity to power the portable electronic device for at least the length that the device is being used. Sufficient battery capacity can result in a power supply that is quite heavy and/or large compared to the rest of the portable electronic device. As such, smaller sized and lighter weight power supplies with sufficient energy storage are desired. Such power supplies can be implemented in smaller and lighter weight portable electronic devices.

Another drawback of conventional batteries is that some of the batteries contain potentially flammable and toxic materials that may leak and may be subject to governmental regulations. As such, it is desired to provide an electrical power supply that is safe, solid-state and rechargeable over many charge/discharge life cycles.

One type of an energy-storage device that is small and light weight, contains non-toxic materials and that can be recharged over many charge/discharge cycles is a solid-state, lithium-based battery. Solid-state, lithium-based batteries are rechargeable batteries that include two electrodes implementing lithium. Typically, lithium-based batteries include a lithiated cathode material layer and an anode region that includes lithium. In some embodiments, the anode region can be formed during a charging/recharging process.

In conventional solid-state, lithium-based batteries the cathode side of the battery is formed prior to forming the anode side. In such solid-state, lithium-based batteries, the lithium-containing anode region may undergo oxidation. Moreover, and in some cases, the anode region of a conventional solid-state, lithium-based battery has an uneven distribution of lithium. Also, conventional solid-state, lithium-based thin-film batteries are not fast charging and have a low capacity. There is thus a need for providing an all solid-state lithium-based thin-film battery that has fast charging rates and high capacity and that circumvents, to at least some degree, the problems of anode oxidation and lithium distribution.

SUMMARY

An all solid-state lithium-based thin-film battery (hereinafter "all solid-state lithium-based battery) is provided. The term "thin-film battery" is used throughout the present application to denote a battery whose thickness is 100 μm or less. The term "all solid-state" denotes a battery that is entirely composed of solid materials. The all solid-state lithium-based battery includes a battery material stack of, from bottom to top, an anode-side electrode, an anode region, an aluminum oxide interfacial layer, a solid-state electrolyte layer, a cathode layer, and a cathode-side electrode layer. The all solid-state lithium-based battery stack is formed by first forming the anode-side of the battery stack and thereafter forming the cathode-side. All solid-state lithium-based batteries including the aluminum oxide interfacial layer located between the anode region and the solid-state electrolyte layer have improved performance, high capacity, and high reliability. In some embodiments, the all solid-state lithium-based battery has a fast charge rate C, wherein C is the total charge capacity/hr. By "fast charge rate C" it is meant a charge rate of 3 C or greater. In some embodiments, the all solid-state lithium-based battery has a specific charge capacity of greater than 50 mAh/g.

In one aspect of the present application, all solid-state lithium-based battery is provided. In one embodiment, the all solid-state lithium-based battery may include an anode-side electrode located on a physically exposed surface of a substrate. An aluminum oxide interfacial layer is located on the anode-side electrode. A lithium-based solid-state electrolyte layer is located on a physically exposed surface of the aluminum oxide interfacial layer. A lithiated cathode material layer is located on a physically exposed surface of the lithium-based solid-state electrolyte layer, and a cathode-side electrode is located on a physically exposed surface of the lithiated cathode material layer.

In another embodiment, the solid-state lithium-based battery may include a continuous anode-side electrode comprising a first horizontal anode-side electrode finger portion, a vertical anode-side electrode portion and a second horizontal anode-side electrode finger portion, wherein the first and second horizontal anode-side electrode finger portions are spaced apart by a gap and wherein the first horizontal anode-side electrode finger portion contacts a bottom portion of a first sidewall of the vertical anode-side electrode portion, and the second horizontal anode-side electrode finger portion contacts a top portion of the first sidewall of the vertical anode-side electrode portion. A continuous aluminum oxide interfacial layer is located on the sidewalls and topmost surface of first horizontal anode-side electrode finger portion, on the first sidewall of the vertical anode-side electrode portion, and on a bottommost surface, a sidewall surface and a topmost surface of the second horizontal anode-side electrode finger portion. A lithium-based solid-state electrolyte layer is located on the continuous aluminum oxide interfacial layer. A lithiated cathode material layer is located on the lithium-based solid-state electrolyte, and a cathode-side electrode is located on the lithiated cathode material. In this embodiment, the cathode-side electrode comprises a first horizontal cathode-side electrode finger portion, a vertical cathode-side electrode portion and a second horizontal cathode electrode finger portion, the first horizontal cathode-side electrode finger portion contacts a middle portion of a first sidewall of the vertical cathode-side electrode portion, and the second horizontal cathode-side electrode finger portion contacts a top portion of the first sidewall of the vertical cathode-side electrode portion. In accordance with the present application, the first horizontal cathode-side electrode finger portion, and a portion of each of the aluminum oxide interfacial layer, the lithium-based solid-state electrolyte and the lithiated cathode material layer are present in the gap, and the second horizontal cathode-side electrode finger portion is located above the second horizontal anode-side electrode finger portion.

In another aspect of the present application, a method of forming a solid-state lithium-based battery is provided. In one embodiment, the method may include forming an anode-side electrode on a physically exposed surface of a substrate. Next, an aluminum oxide interfacial layer is formed on the anode-side electrode. A lithium-based solid-state electrolyte layer is then formed on a physically exposed surface of the aluminum oxide interfacial layer. Next, a lithiated cathode material layer is formed on a physically exposed surface of the lithium-based solid-state electrolyte layer, and thereafter, a cathode-side electrode is formed on a physically exposed surface of the lithiated cathode material layer.

In another embodiment, the method may include forming a continuous anode-side electrode on surface of a substrate, the continuous anode-side electrode comprising a first horizontal anode-side electrode finger portion, a vertical anode-side electrode portion and a second horizontal anode-side electrode finger portion, wherein the first and second horizontal anode-side electrode finger portions are spaced apart by a gap and wherein the first horizontal anode-side electrode finger portion contacts a bottom portion of a first sidewall of the vertical anode-side electrode portion, and the second horizontal anode-side electrode finger portion contacts a top portion of the first sidewall of the vertical anode-side electrode portion, Next, a continuous aluminum oxide interfacial layer is formed on the sidewalls and topmost surface of first horizontal anode-side electrode finger portion, on the first sidewall of the vertical anode-side electrode portion, and on a bottommost surface, a sidewall surface and a topmost surface of the second horizontal anode-side electrode finger portion. A lithium-based solid-state electrolyte layer is then formed on the aluminum oxide interfacial layer, and a lithiated cathode material layer is thereafter formed on the lithium-based solid-state electrolyte layer. Next, a cathode-side electrode is formed on a physically exposed surface of the lithiated cathode material layer, wherein the cathode-side electrode comprises a first horizontal cathode-side electrode finger portion, a vertical cathode-side electrode portion and a second horizontal cathode electrode finger portion, the first horizontal cathode-side electrode finger portion contacts a middle portion of a first sidewall of the vertical cathode-side electrode portion, and the second horizontal cathode-side electrode finger portion contacts a top portion of the first sidewall of the vertical cathode-side electrode portion, and wherein the first horizontal cathode-side electrode finger portion, and a portion of each of the aluminum oxide interfacial layer, the lithium-based solid-state electrolyte and the lithiated cathode material layer are present in the gap, and the second horizontal cathode-side electrode finger portion is located above the second horizontal anode-side electrode finger portion.

DETAILED DESCRIPTION

The present application will now be described in greater detail by referring to the following discussion and drawings that accompany the present application. It is noted that the drawings of the present application are provided for illustrative purposes only and, as such, the drawings are not drawn to scale. It is also noted that like and corresponding elements are referred to by like reference numerals.

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

It will be understood that when an element as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "beneath" or "under" another element, it can be directly beneath or under the other element, or intervening elements may be present. In contrast, when an element is referred to as being "directly beneath" or "directly under" another element, there are no intervening elements present.

Figure 1:
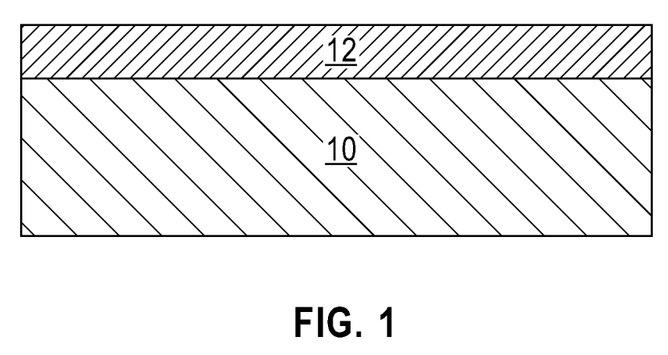
FIG. 1 is a cross sectional view of an exemplary structure including an anode-side electrode located on a surface of a substrate that can be employed in accordance with an embodiment of the present application.

Referring now to FIG. 1, there is illustrated an exemplary structure including an anode-side electrode located 12 on a surface of a substrate 10 that can be employed in accordance with an embodiment of the present application. As is shown and for this embodiment of the present application, the anode-side electrode 12 is a continuous layer (without any intentionally formed gaps or breaks) that is present on an entirety of the substrate 10.

The substrate 10 that can be employed in the present application includes any conventional material that is used as a substrate for a solid-state lithium-based battery. The substrate 10 that is employed should be composed of a material that limits lithium ion diffusion there through. In one embodiment, the substrate 10 may include one or more semiconductor materials. The term "semiconductor material" is used throughout the present application to denote a material having semiconducting properties.

Examples of semiconductor materials that may be employed as substrate 10 include silicon (Si), germanium (Ge), silicon germanium alloys (SiGe), silicon carbide (SiC), silicon germanium carbide (SiGeC), III-V compound semiconductors or II-VI compound semiconductors. III-V compound semiconductors are materials that include at least one element from Group III of the Periodic Table of Elements and at least one element from Group V of the Periodic Table of Elements. II-VI compound semiconductors are materials that include at least one element from Group II of the Periodic Table of Elements and at least one element from Group VI of the Periodic Table of Elements.

In one embodiment, the semiconductor material that may provide substrate 10 is a bulk semiconductor substrate. By "bulk" it is meant that the substrate 10 is entirely composed of at least one semiconductor material, as defined above. In one example, the substrate 10 may be entirely composed of silicon. In some embodiments, the bulk semiconductor substrate may include a multilayered semiconductor material stack including at least two different semiconductor materials, as defined above. In one example, the multilayered semiconductor material stack may comprise, in any order, a stack of Si and a silicon germanium alloy.

In another embodiment, substrate 10 is composed of a topmost semiconductor material layer of a semiconductor-on-insulator (SOI) substrate. The SOI substrate would also include a handle substrate (not shown) including one of the above mentioned semiconductor materials, and an insulator layer (not shown) such as a buried oxide below the topmost semiconductor material layer.

In any of the embodiments mentioned above, the semiconductor material that may provide the substrate 10 may be a single crystalline semiconductor material. The semiconductor material that may provide the substrate 10 may have any of the well known crystal orientations. For example, the crystal orientation of the semiconductor material that may provide substrate 10 may be {100}, {110}, or {111}. Other crystallographic orientations besides those specifically mentioned can also be used in the present application.

In another embodiment, the substrate 10 is a metallic material such as, for example, aluminum (Al), aluminum alloy, titanium (Ti), tantalum (Ta), tungsten (W), or molybdenum (Mo).

In yet another embodiment, the substrate 10 is a dielectric material such as, for example, doped or non-doped silicate glass, silicon dioxide, or silicon nitride. In yet a further embodiment, the substrate 10 is composed of a polymer or flexible substrate material such as, for example, a polyimide, a polyether ketone (PEEK) or a transparent conductive polyester. In yet an even further embodiment, the substrate 10 may be composed of a multilayered stack of at least two of the above mentioned substrate materials, e.g., a stack of silicon and silicon dioxide.

The substrate 10 that can be used in the present application can have a thickness from 10 μm to 5 mm. Other thicknesses that are lesser than, or greater than, the aforementioned thickness values may also be used for substrate 10.

In some embodiments, the substrate 10 may have a non-textured (flat or planar) surface. The term "non-textured surface" denotes a surface that is smooth and has a surface roughness on the order of less than 100 nm root mean square as measured by profilometry. In yet another embodiment, the substrate 10 may have a textured surface. In such an embodiment, the surface roughness of the textured substrate can be in a range from 100 nm root mean square to 100 μm root mean square as also measured by profilometry. Texturing can be performed by forming a plurality of etching masks (e.g., metal, insulator, or polymer) on the surface of a non-textured substrate, etching the non-textured substrate utilizing the plurality of masks as an etch mask, and removing the etch masks from the non-textured surface of the substrate. In some embodiments, the textured surface of the substrate is composed of a plurality of pyramids. In yet another embodiment, the textured surface of the substrate is composed of a plurality of cones. In some embodiments, a plurality of metallic masks are used, which may be formed by depositing a layer of a metallic material and then performing an anneal. During the anneal, the layer of metallic material melts and balls-ups such that de-wetting of the surface of the substrate occurs.

The anode-side electrode 12 may include any metallic anode-side electrode material such as, for example, titanium (Ti), platinum (Pt), nickel (Ni), copper (Cu) or titanium nitride (TiN). In one example, the anode-side electrode 12 includes a stack of, from bottom to top, nickel (Ni) and copper (Cu). The anode-side electrode 12 may be formed utilizing a deposition process including, for example, chemical vapor deposition (CVD), plasma enhanced chemical vapor deposition (PECVD), evaporation, sputtering, or plating. The anode-side electrode 12 may have a thickness from 10 nm to 500 nm. Other thicknesses that are lesser than, or greater than, the aforementioned thickness values may also be used for the anode-side electrode 12.

Figure 2:
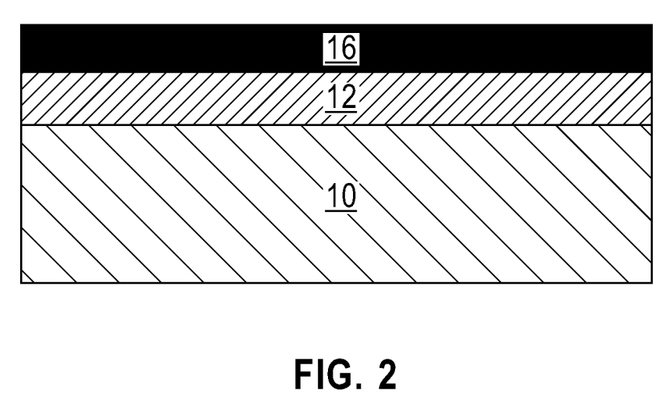
FIG. 2 is a cross sectional view of the exemplary structure of FIG. 1 after forming an aluminum oxide (i.e., $Al_2O_3$) interfacial layer on a physically exposed surface of the anode-side electrode.

Referring now to FIG. 2, there is illustrated the exemplary structure of FIG. 1 after forming an aluminum oxide (i.e., $Al_2O_3$) interfacial layer 16 on a physically exposed surface of the anode-side electrode 12. As is show, the aluminum oxide interfacial layer 16 is a continuous layer that covers the entirety of the underlying anode-side electrode 12. In this embodiment of the present application, the aluminum oxide interfacial layer 16 is formed directly on a physically exposed surface of the anode-side electrode 12. In other embodiments (see, FIG. 7), the aluminum oxide interfacial layer 16 is formed directly upon an intentionally deposited anode material.

The aluminum oxide interfacial layer 16 may be formed utilizing a deposition process such as, for example, chemical vapor deposition, plasma enhanced chemical vapor deposition, or atomic layer deposition. The aluminum oxide interfacial layer 16 may have a thickness from 1 nm to 50 nm. Other thicknesses that are lesser than, or greater than, the aforementioned thickness values may also be used for the aluminum oxide interfacial layer 16.

The presence of the aluminum oxide interfacial layer 16 helps to improve the uniformity of lithium distribution in the resultant all solid-state lithium-based battery stack of the present application. The presence of the aluminum oxide interfacial layer 16 aids in reducing, and in some instances, eliminates, oxidation of the anode region, which can be intentionally deposited or formed in-situ during a charging/recharging process.

Figure 3:
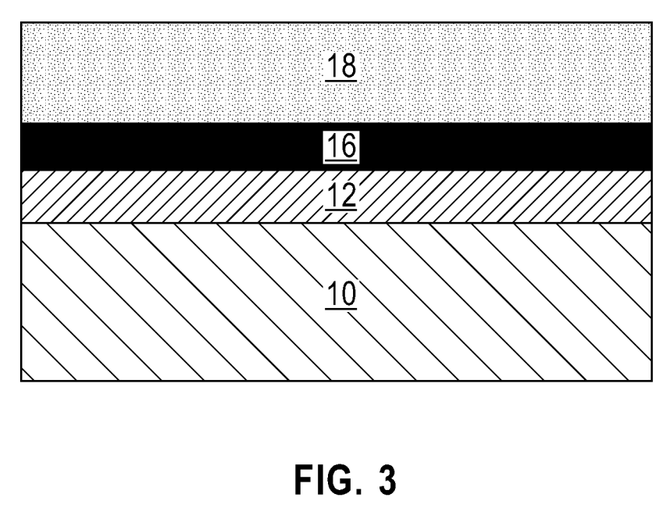
FIG. 3 is a cross sectional view of the exemplary structure of FIG. 2 after forming a solid-state electrolyte layer on a physically exposed surface of the aluminum oxide interfacial layer.

Referring now to FIG. 3, there is illustrated the exemplary structure of FIG. 2 after forming a solid-state electrolyte layer 18 on a physically exposed surface of the aluminum oxide interfacial layer 16. The solid-state electrolyte layer 18 is a continuous layer that is present on an entirety of the underlying aluminum oxide interfacial layer 16.

The solid-state electrolyte layer 18 includes a material that enables the conduction of lithium ions; the solid-state electrolyte layer 18 may be referred to as a lithium-based solid-state electrolyte layer. Such materials may be electrically insulating or ionic conducting. Examples of materials that can be employed as the solid-state electrolyte layer 18 include, but are not limited to, lithium phosphorus oxynitride (LiPON) or lithium phosphosilicate oxynitride (LiSiPON).

The solid-state electrolyte layer 18 may be formed utilizing a deposition process such as, sputtering or plating. In one embodiment, the solid-state electrolyte layer 18 is formed by sputtering utilizing any conventional precursor source material. Sputtering may be performed in the presence of at least a nitrogen-containing ambient. Examples of nitrogen-containing ambients that can be employed include, but are not limited to, $N_2$, $NH_3$, $NH_4$, NO, or $NH_x$ wherein x is between 0 and 1. Mixtures of the aforementioned nitrogen-containing ambients can also be employed. In some embodiments, the nitrogen-containing ambient is used neat, i.e., non-diluted. In other embodiments, the nitrogen-containing ambient can be diluted with an inert gas such as, for example, helium (He), neon (Ne), argon (Ar) and mixtures thereof. The content of nitrogen ($N_2$) within the nitrogen-containing ambient employed is typically from 10% to 100%, with a nitrogen content within the ambient from 50% to 100% being more typical.

The solid-state electrolyte layer 18 may have a thickness from 10 nm to 10 µm. Other thicknesses that are lesser than, or greater than, the aforementioned thickness values may also be used for the solid-state electrolyte layer 18.

Figure 4:
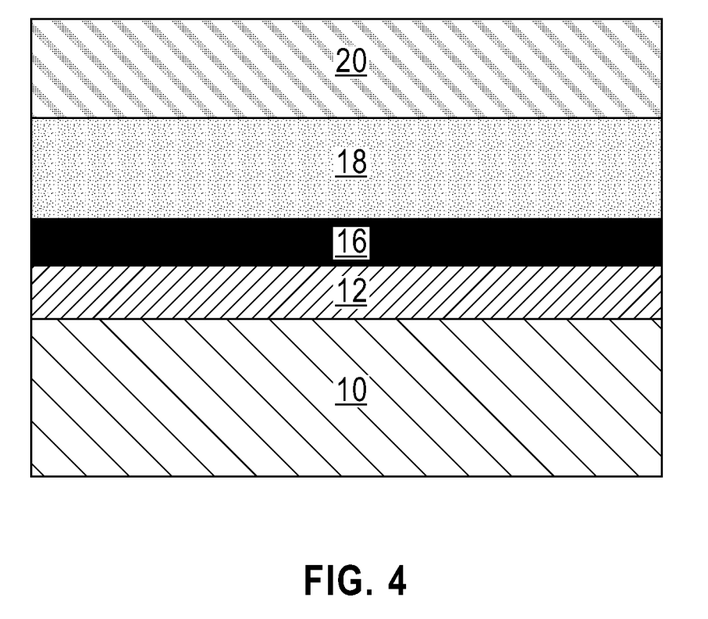
FIG. 4 is a cross sectional view of the exemplary structure of FIG. 3 after forming a cathode layer on a physically exposed surface of the solid-state electrolyte layer.

Referring now to FIG. 4, there is illustrated the exemplary structure of FIG. 3 after forming a cathode layer 20 on a physically exposed surface of the solid-state electrolyte layer 18. The cathode layer 20 is a continuous layer that is present on an entirety of the underlying solid-state electrolyte layer 18.

The cathode layer 20 may include a lithiated material such as, for example, a lithium-based mixed oxide. Hence, the cathode layer 20 may be referred to as a lithiated cathode material layer. Examples of lithium-based mixed oxides that may be employed as the cathode layer 20 include, but are not limited to, lithium cobalt oxide ($LiCoO_2$), lithium nickel oxide ($LiNiO_2$), lithium manganese oxide ($LiMn_2O_4$), lithium vanadium pentoxide ($LiV_2O_5$) or lithium iron phosphate ($LiFePO_4$).

The cathode layer 20 may be formed utilizing a deposition process such as, sputtering or plating. In one embodiment, the cathode layer 20 is formed by sputtering utilizing any conventional precursor source material or combination of precursor source materials. In one example, a lithium precursor source material and a cobalt precursor source material are employed in forming a lithium cobalt mixed oxide. Sputtering may be performed in an admixture of an inert gas and oxygen. In such an embodiment, the oxygen content of the inert gas/oxygen admixture can be from 0.1 atomic percent to 70 atomic percent, the remainder of the admixture includes the inert gas. Examples of inert gases that may be used include argon, helium, neon, nitrogen or any combination thereof.

The cathode layer 20 may have a thickness from 10 nm to 20 µm. Other thicknesses that are lesser than, or greater than, the aforementioned thickness values may also be used for cathode layer 20.

Figure 5:
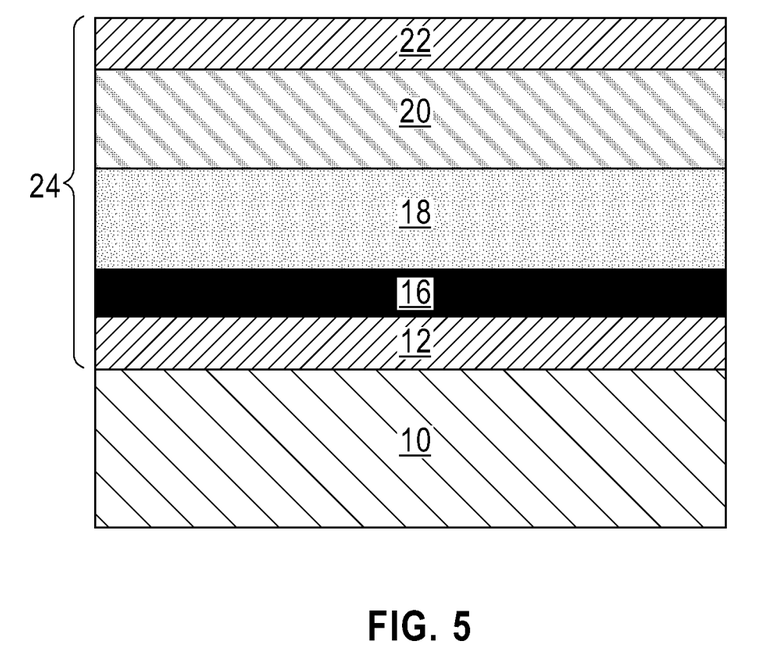
FIG. 5 is a cross sectional view of the exemplary structure of FIG. 4 after forming a cathode-side electrode on a physically exposed surface of the cathode layer.

Referring now to FIG. 5, there is illustrated the exemplary structure of FIG. 4 after forming a cathode-side electrode 22 on a physically exposed surface of the cathode layer 20. The cathode-side electrode 22 may include any metallic cathode-side electrode material such as, for example, titanium (Ti), platinum (Pt), nickel (Ni), aluminum (Al) or titanium nitride (TiN). In one example, the cathode-side electrode 22 includes a stack of, from bottom to top, titanium (Ti), platinum (Pt) and titanium (Ti). In one embodiment, the metallic electrode material that provides the cathode-side electrode 22 may be the same as the metallic electrode material that provides the anode-side electrode 12. In another embodiment, the metallic electrode material that provides the cathode-side electrode 22 may be different from the metallic electrode material that provides the anode-side electrode 12. The cathode-side electrode 22 may be formed utilizing one of the deposition processes mentioned above for forming the anode-side electrode 12. The cathode-side electrode 22 may have a thickness within the range mentioned above for the anode-side electrode 12.

Collectively, the anode-side electrode 12, the aluminum oxide interfacial layer 16, the solid-state electrolyte layer 18, the cathode layer 20 and the cathode-side electrode 22 are components of an all solid-state lithium-based battery stack 24 of the present application.

In some embodiments, the solid-state lithium-based battery stack 24 shown in FIG. 5 may be patterned by any conventional patterning process such, as for example, lithography and etching. In some embodiments, an air and/or moisture impermeable structure may be formed surrounding the patterned or non-patterned solid-state lithium-based battery stack. The air and/or moisture impermeable structure includes any air and/or moisture impermeable material or multilayered stack of such materials. Examples of air and/or moisture impermeable materials that can be employed in the present application include, but are not limited to, parylene, a fluoropolymer, silicon nitride, and/or silicon dioxide. The air and/or moisture impermeable structure may be formed by first depositing the air and/or moisture impermeable material and thereafter patterning the air and/or moisture impermeable material. In one embodiment, patterning may be performed by lithography and etching. The air and/or moisture impermeable structure is located surrounding at least the sidewall surfaces of the patterned solid-state lithium-based battery stack.

The all solid-state lithium-based battery stack 24 (patterned or non-patterned) may be charged/recharged utilizing conventional techniques well known to those skilled in the art. For example, the all solid-state lithium-based battery stack 24 (patterned or non-patterned) can be charged/recharged by connecting the all solid-state lithium-based battery stack 24 (patterned or non-patterned) to an external power supply.

The solid-state lithium-based battery stack 24 of the present application exhibits enhanced battery performance in terms of charge rate and specific charge capacity. In some embodiments and for solid-state lithium based batteries, the all solid-state lithium-based battery stack 24 of the present application may have a fast charge rate C, wherein C is the total charge capacity/hr. By "fast charge rate C" it is meant a charge rate of 3 C or greater. In some embodiments, the all solid-state lithium-based battery stack 24 of the present application has a specific charge capacity of greater than 50 mAh/g.

Figure 6:
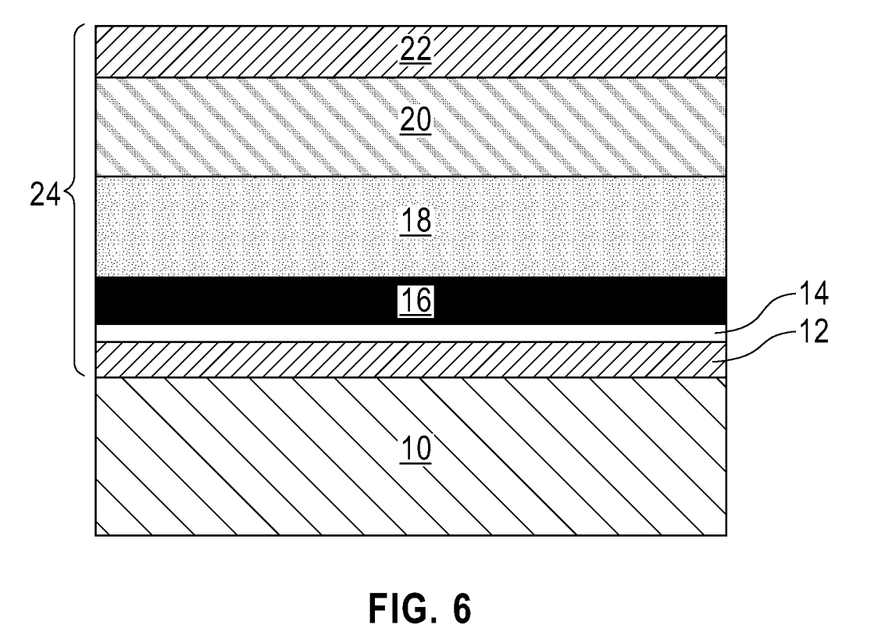
FIG. 6 is a cross sectional view of the exemplary structure of FIG. 5 after performing a charging/recharging process.

Referring now to FIG. 6, there is illustrated the exemplary structure of FIG. 5 after performing a charging/recharging process, as defined above. In accordance with this embodiment of the present application, an anode region 14 forms between the anode-side electrode 12 and the aluminum oxide interfacial layer 16 during the charging/recharging process. In this embodiment, the anode region 14 may be referred to herein as a lithium accumulation region and the anode region includes at least lithium and a partially lithiated interfacial layer. The anode region 14 may, or may not, be a continuous layer.

Figure 7:
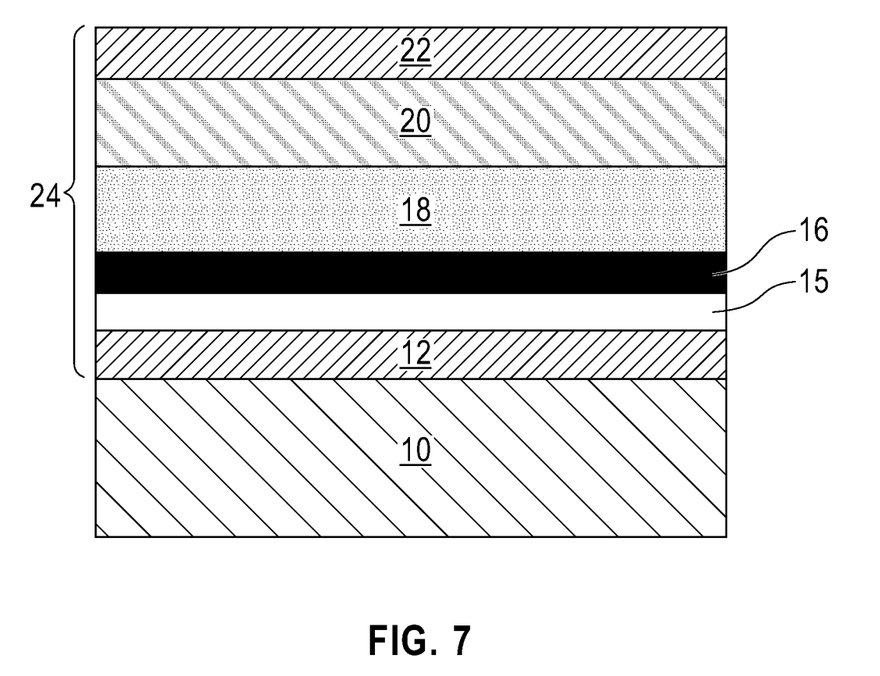
FIG. 7 is a cross sectional view of another exemplary structure of the present application in which an all solid-state lithium-based battery stack including a deposited anode region is formed on a surface of a substrate.

Referring now to FIG. 7, there is illustrated another exemplary structure of the present application. In this embodiment, a solid-state lithium-based battery stack 24 is formed on substrate 10. The solid-state lithium-based battery stack 24 of this embodiment is similar to the solid-state lithium-based battery stack 24 of FIG. 5 except that an anode region 15 is formed prior to charging/recharging. In this embodiment, the anode region 15 includes any material that is a lithium ion generator or lithium intercalation active material. Examples of materials that may be used as anode region 15 include, but are not limited to, lithium metal, a lithium-base alloy such as, for example, $Li_xSi$, or a lithium-based mixed oxide such as, for example, lithium titanium oxide ($Li_2TiO_3$). The anode region 15 may be a continuous layer.

As stated above, the anode region 15 of this embodiment of the present application is formed prior to performing a charging/recharging process. In such an embodiment, the anode region 15 can be formed utilizing a deposition process such as, for example, chemical vapor deposition (CVD), plasma enhanced chemical vapor deposition (PECVD), evaporation, sputtering or plating.

The solid-state lithium-based battery stack 24 shown in FIG. 7 may be patterned as defined above. In some embodiments, an air and/or moisture impermeable structure as defined above may be formed surrounding the patterned or non-patterned solid-state lithium-based battery stack.

Figure 8:
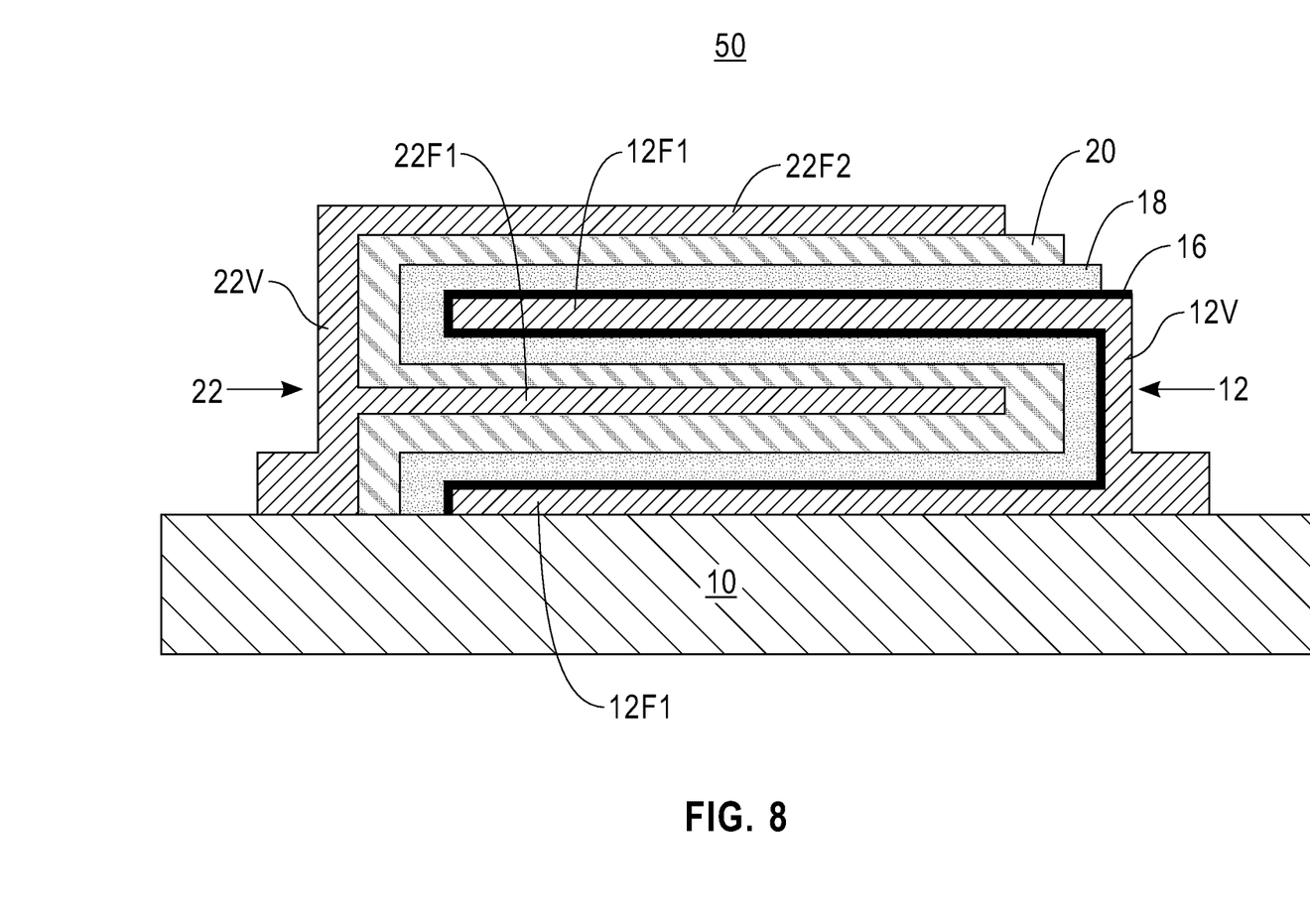
FIG. 8 is a cross sectional view of a back to back all solid-state lithium-based battery for use in large scale integration.

Referring now to FIG. 8, there is illustrated a back to back all solid-state lithium-based battery 50 for use in large scale integration in accordance with another embodiment of the present application. The solid-state lithium-based battery 50 includes a continuous anode-side electrode 12 comprising a first horizontal anode-side electrode finger portion 12F1, a vertical anode-side electrode portion 12V and a second horizontal anode-side electrode finger portion 12F2, wherein the first and second horizontal anode-side electrode finger portions (12F1, 12F2) are spaced apart by a gap and wherein the first horizontal anode-side electrode finger portion 12F1 contacts a bottom portion of a first sidewall of the vertical anode-side electrode portion 12V, and the second horizontal anode-side electrode finger portion 12F2 contacts a top portion of the first sidewall of the vertical anode-side electrode portion 12V. A continuous aluminum oxide interfacial layer 16 is located on the sidewalls and topmost surface of first horizontal anode-side electrode finger portion 12F1, on the first sidewall of the vertical anode-side electrode portion 12V, and on a bottommost surface, a sidewall surface and a topmost surface of the second horizontal anode-side electrode finger portion 12F2. A lithium-based solid-state electrolyte layer 18 is located on the continuous aluminum oxide interfacial layer 16. A lithiated cathode material layer 20 is located on the lithium-based solid-state electrolyte 18, and a cathode-side electrode 22 is located on the lithiated cathode material layer 20. In this embodiment, the cathode-side electrode 22 comprises a first horizontal cathode-side electrode finger portion 22F1, a vertical cathode-side electrode portion 22V and a second horizontal cathode electrode finger portion 22F2, the first horizontal cathode-side electrode finger portion 22F1 contacts a middle portion of a first sidewall of the vertical cathode-side electrode portion 22V, and the second horizontal cathode-side electrode finger portion 22F2 contacts a top portion of the first sidewall of the vertical cathode-side electrode portion 22V. As is shown in FIG. 8, the first horizontal cathode-side electrode finger portion 22F1, and a portion of each of the aluminum oxide interfacial layer 16, the lithium-based solid-state electrolyte 18 and the lithiated cathode material layer 20 are present in the gap, and the second horizontal cathode-side electrode finger portion 22F is located above the second horizontal anode-side electrode finger portion 12F1. As is further shown, a bottommost surface of the first horizontal anode-side electrode finger portion 12F1 is located directly on a topmost surface of a substrate 10. As is further shown, the vertical cathode-side electrode portion 22V has a height that is greater than a height of the vertical anode-side electrode portion 12V.

The solid-state lithium-based battery 50 shown in FIG. 1 may be formed utilizing a shadow mask and wherein the position of the shadow mask is moved after each layer is formed. Multiple shadow masks can be also used during the formation of each of the components of the battery 50.

While the present application has been particularly shown and described with respect to preferred embodiments thereof, it will be understood by those skilled in the art that the foregoing and other changes in forms and details may be made without departing from the spirit and scope of the present application. It is therefore intended that the present application not be limited to the exact forms and details described and illustrated, but fall within the scope of the appended claims.

What is claimed is:

1. A solid-state lithium-based battery comprising:
a continuous anode-side electrode comprising a first horizontal anode-side electrode finger portion, a vertical anode-side electrode portion and a second horizontal anode-side electrode finger portion, wherein the first and second horizontal anode-side electrode finger portions are spaced apart by a gap and wherein the first horizontal anode-side electrode finger portion contacts a bottom portion of a first sidewall of the vertical anode-side electrode portion, and the second horizontal anode-side electrode finger portion contacts a top portion of the first sidewall of the vertical anode-side electrode portion;
a continuous aluminum oxide interfacial layer located on the sidewalls and topmost surface of first horizontal anode-side electrode finger portion, on the first sidewall of the vertical anode-side electrode portion, and on a bottommost surface, a sidewall surface and a topmost surface of the second horizontal anode-side electrode finger portion;
a lithium-based solid-state electrolyte layer located on the continuous aluminum oxide interfacial layer;
a lithiated cathode material layer located on the lithium-based solid-state electrolyte; and
a cathode-side electrode located on the lithiated cathode material, wherein the cathode-side electrode comprises a first horizontal cathode-side electrode finger portion, a vertical cathode-side electrode portion and a second horizontal cathode electrode finger portion, the first horizontal cathode-side electrode finger portion contacts a middle portion of a first sidewall of the vertical cathode-side electrode portion, and the second horizontal cathode-side electrode finger portion contacts a top portion of the first sidewall of the vertical cathode-side electrode portion, and wherein the first horizontal cathode-side electrode finger portion, and a portion of each of the aluminum oxide interfacial layer, the lithium-based solid-state electrolyte and the lithiated cathode material layer are present in the gap, and the second horizontal cathode-side electrode finger portion is located above the second horizontal anode-side electrode finger portion.

2. The solid-state lithium-based battery of claim 1, further comprising an anode region located between the aluminum oxide interfacial layer and the anode-side electrode.

3. The solid-state lithium-based battery of claim 2, wherein the anode region is a lithium accumulation region formed during a charging/recharging process.

4. The solid-state lithium-based battery of claim 3, wherein the anode region is a deposited anode material.

5. The solid-state lithium-based battery of claim 1, wherein the aluminum oxide interfacial layer has a thickness from 1 nm to 50 nm.

6. The solid-state lithium-based battery of claim 1, wherein a bottommost surface of the first horizontal anode-side electrode portion is located directly on a topmost surface of a substrate.

7. The solid-state lithium-based battery of claim 1, wherein the solid-state lithium-based battery has a charge rate of greater than 3 C.

8. A method of forming a solid-state lithium-based battery, the method comprising:
   forming a continuous anode-side electrode on surface of a substrate, the continuous anode-side electrode comprising a first horizontal anode-side electrode finger portion, a vertical anode-side electrode portion and a second horizontal anode-side electrode finger portion, wherein the first and second horizontal anode-side electrode finger portions are spaced apart by a gap and wherein the first horizontal anode-side electrode finger portion contacts a bottom portion of a first sidewall of the vertical anode-side electrode portion, and the second horizontal anode-side electrode finger portion contacts a top portion of the first sidewall of the vertical anode-side electrode portion;
   forming a continuous aluminum oxide interfacial layer on the sidewalls and topmost surface of first horizontal anode-side electrode finger portion, on the first sidewall of the vertical anode-side electrode portion, and on a bottommost surface, a sidewall surface and a topmost surface of the second horizontal anode-side electrode finger portion;
   forming a lithium-based solid-state electrolyte layer on the aluminum oxide interfacial layer;
   forming a lithiated cathode material layer on the lithium-based solid-state electrolyte layer; and
   forming a cathode-side electrode on a physically exposed surface of the lithiated cathode material layer, wherein the cathode-side electrode comprises a first horizontal cathode-side electrode finger portion, a vertical cathode-side electrode portion and a second horizontal cathode electrode finger portion, the first horizontal cathode-side electrode finger portion contacts a middle portion of a first sidewall of the vertical cathode-side electrode portion, and the second horizontal cathode-side electrode finger portion contacts a top portion of the first sidewall of the vertical cathode-side electrode portion, and wherein the first horizontal cathode-side electrode finger portion, and a portion of each of the aluminum oxide interfacial layer, the lithium-based solid-state electrolyte and the lithiated cathode material layer are present in the gap, and the second horizontal cathode-side electrode finger portion is located above the second horizontal anode-side electrode finger portion.

9. The method of claim 8, wherein a shadow mask in used during each of the forming of the continuous anode-side electrode, the continuous aluminum oxide interfacial layer, the lithium-based solid-state electrolyte layer, the lithiated cathode material layer, and the cathode-side electrode, and wherein a portion of the shadow mask is removed between each of the forming of the continuous anode-side electrode, the continuous aluminum oxide interfacial layer, the lithium-based solid-state electrolyte layer, the lithiated cathode material layer, and the cathode-side electrode.

* * * * *